(12) United States Patent
Zhao et al.

(10) Patent No.: US 10,353,148 B2
(45) Date of Patent: Jul. 16, 2019

(54) MODE CONVERTER, MULTIMODE WAVEGUIDE TRANSMISSION APPARATUS, AND METHOD

(71) Applicant: HUAWEI TECHNOLOGIES CO., LTD., Shenzhen, Guangdong (CN)

(72) Inventors: Fei Zhao, Wuhan (CN); Xin Tu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/587,468

(22) Filed: May 5, 2017

(65) Prior Publication Data

US 2017/0299812 A1 Oct. 19, 2017

Related U.S. Application Data

(63) Continuation of application No. PCT/CN2014/090614, filed on Nov. 7, 2014.

(51) Int. Cl.
*G02B 6/14* (2006.01)
*G02B 6/124* (2006.01)
(Continued)

(52) U.S. Cl.
CPC ............ *G02B 6/14* (2013.01); *G02B 6/12* (2013.01); *G02B 6/124* (2013.01); *G02B 6/126* (2013.01);
(Continued)

(58) Field of Classification Search
CPC .............. G02B 6/14; G02B 2006/12152
See application file for complete search history.

(56) References Cited

U.S. PATENT DOCUMENTS 8,189,972 B2 * 5/2012 Little ............... G02B 6/12007
385/15
2002/0150333 A1 11/2002 Reed et al.
(Continued)

FOREIGN PATENT DOCUMENTS

CN 1492617 A 4/2004
CN 1497279 A 5/2004
(Continued)

OTHER PUBLICATIONS

Partial Supplementary European Search Report dated Sep. 19, 2017 in corresponding European Patent Application No. 14905486.8.
(Continued)

*Primary Examiner* — Omar R Rojas
(74) *Attorney, Agent, or Firm* — Staas & Halsey LLP

(57) ABSTRACT

A mode converter provided in the present invention includes an input multimode waveguide, an output multimode waveguide, and a first conversion waveguide, where the input multimode waveguide is configured to receive a first signal which mode is a first mode; the first conversion waveguide has an input coupling waveguide with a first effective refractive index, and has an output coupling waveguide with a second effective refractive index; the first conversion waveguide is configured to perform, by using the input coupling waveguide, evanescent wave coupling on the first signal that is in the first mode and that is transmitted in the input multimode waveguide, and couple the first signal to the second mode of the output multimode waveguide by using the output coupling waveguide, so as to obtain the first signal in the second mode; and the output multimode waveguide is configured to output the first signal in the second mode.

19 Claims, 9 Drawing Sheets

(51) Int. Cl.
    *G02B 6/126* (2006.01)
    *G02B 6/12* (2006.01)
    *G02B 6/13* (2006.01)
    *G02B 6/38* (2006.01)
    *H04J 14/04* (2006.01)
    *H04B 10/2581* (2013.01)

(52) U.S. Cl.
    CPC ............. *G02B 6/13* (2013.01); *G02B 6/3885* (2013.01); *H04B 10/2581* (2013.01); *H04J 14/04* (2013.01); *G02B 2006/121* (2013.01)

(56) References Cited

U.S. PATENT DOCUMENTS

| | | |
|---|---|---|
| 2004/0037497 A1 | 2/2004 | Lee |
| 2004/0047551 A1 | 3/2004 | Ramachandran |
| 2009/0041410 A1 | 2/2009 | De Barros et al. |
| 2013/0188910 A1 | 7/2013 | Tokushima et al. |
| 2014/0126588 A1 | 5/2014 | Koebele et al. |
| 2014/0186040 A1 | 7/2014 | Fujiwara et al. |

FOREIGN PATENT DOCUMENTS

| | | |
|---|---|---|
| CN | 1846158 A | 10/2006 |
| CN | 103217738 A | 7/2013 |
| CN | 103609040 A | 2/2014 |
| EP | 1193515 A2 | 4/2002 |
| EP | 2 645 609 A1 | 10/2013 |
| JP | 2015121626 A * | 7/2015 |
| WO | 03/100485 A2 | 12/2003 |
| WO | 2013/144062 A1 | 10/2013 |
| WO | 2014/034249 A1 | 3/2014 |

OTHER PUBLICATIONS

International Search Report, dated Jul. 31, 2015, in International Application No. PCT/CN2014/090614 (4 pp.).

International Search Report dated Jul. 31, 2015 in corresponding International Application No. PCT/CN2014/090614.

* cited by examiner

MODE CONVERTER, MULTIMODE WAVEGUIDE TRANSMISSION APPARATUS, AND METHOD

CROSS-REFERENCE TO RELATED APPLICATIONS

This application is a continuation of International Application No. PCT/CN2014/090614, filed on Nov. 7, 2014, the disclosure of which is hereby incorporated by reference in its entirety.

TECHNICAL FIELD

The present disclosure relates to the communications field, and in particular, to a mode converter, a multimode waveguide transmission apparatus, and method.

BACKGROUND

Short-range optical interconnection is a very promising solution for implementing a large-capacity switching between large-scale parallel multiprocessor chips in the future. A transmission capacity may be expanded by introducing a wavelength division multiplexing (WDM) technology, a polarization division multiplexing (PDM) technology, and a mode division multiplexing (MDM) technology, and the WDM and PDM technologies have been applied to a single-mode optical waveguide.

A multimode waveguide may greatly expand the transmission capacity by using the mode division multiplexing technology. Currently, in the prior art, there is a solution for implementing a mode multiplexer and a mode demultiplexer that are used to perform a direct mode conversion between a multimode waveguide and a single-mode waveguide in a system on chip. The mode multiplexer and the mode demultiplexer may implement the short-range optical interconnection by using the multimode waveguide.

In the system on chip, during establishment of an optical switching system of the multimode waveguide, in addition to the direct mode conversion between the multimode waveguide and the single-mode waveguide, switching between signals in different modes needs to be implemented, so as to meet requirements for switching and transmission between multiple modes in the optical switching system. In the prior art, as shown in FIG. 1, a multimode demultiplexer is used to demultiplex an input multimode signal into a single-mode waveguide, and then a multimode multiplexer is used to multiplex the signal into a multimode waveguide, so as to complete a conversion between different modes.

However, in the prior art, to implement a conversion between different modes, because two conversion devices, that is, a multimode demultiplexer and a multimode multiplexer, are used, an insertion loss (the insertion loss refers to a signal loss caused when a cable or a component is inserted between a transmitter and a receiver) is relatively large. In addition, in the prior art, all modes are converted in a unified manner, and when only some modes need to be converted, all the modes may need to be demultiplexed into a single-mode waveguide, and therefore, an overall size is relatively large, and an optical switching system cannot be easily implemented.

SUMMARY

An embodiments of the present invention provides a mode converter, including:

an input multimode waveguide, an output multimode waveguide, and a first conversion waveguide, where:

the input multimode waveguide is configured to receive a first signal, and a mode of the first signal is a first mode;

the first conversion waveguide has an input coupling waveguide with a first effective refractive index, and has an output coupling waveguide with a second effective refractive index; and the first effective refractive index is corresponding to an effective refractive index of the first signal that is in the first mode and that is in the input multimode waveguide, and the second effective refractive index is corresponding to an effective refractive index of the first signal that is in a second mode and that is in the output multimode waveguide;

the first conversion waveguide is configured to: perform, by using the input coupling waveguide, evanescent wave coupling on the first signal that is in the first mode and that is transmitted in the input multimode waveguide, and couple the first signal to the second mode of the output multimode waveguide by using the output coupling waveguide, so as to obtain the first signal in the second mode; and the output multimode waveguide is configured to output the first signal in the second mode.

Another embodiments of the present invention provides a multimode waveguide transmission apparatus, including:

M or M+1 multimode transmission waveguides and M mode converters, where the multimode transmission waveguides are alternately connected to the mode converters, M is greater than or equal to a quantity of signals that require a mode conversion, and M is an integer;

the mode converter is configured to separately perform the mode conversion on a first signal and a second signal that are input, where modes of the first signal and the second signal are respectively a first mode and a second mode before the first mode converter performs the mode conversion, and when the last mode converter completes the conversion, a mode of each signal is the same as a mode before the first mode conversion; and the multimode transmission waveguide is configured to transmit the first signal and the second signal, where in the first mode or the second mode, the first signal and the second signal are transmitted for an equal distance in the multimode transmission waveguide.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 2:
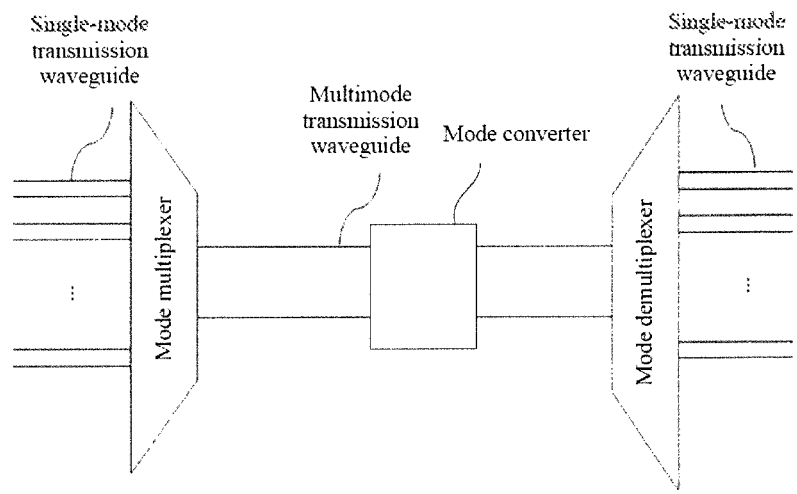
FIG. 2 is a schematic diagram of multimode waveguide interconnection according to an embodiment of the present invention.

In an application scenario of an embodiment of the present invention, for a schematic diagram of multimode waveguide interconnection, refer to FIG. 2. In a process in which a signal transmitted in multiple single-mode transmission waveguides is multiplexed into a multimode transmission waveguide for transmission, according to an actual requirement, a mode converter needs to be disposed between a mode multiplexer and a mode demultiplexer in FIG. 2, so as to perform a mode conversion on the signal that is in multiple modes and that is in the multimode waveguide.

Figure 3:
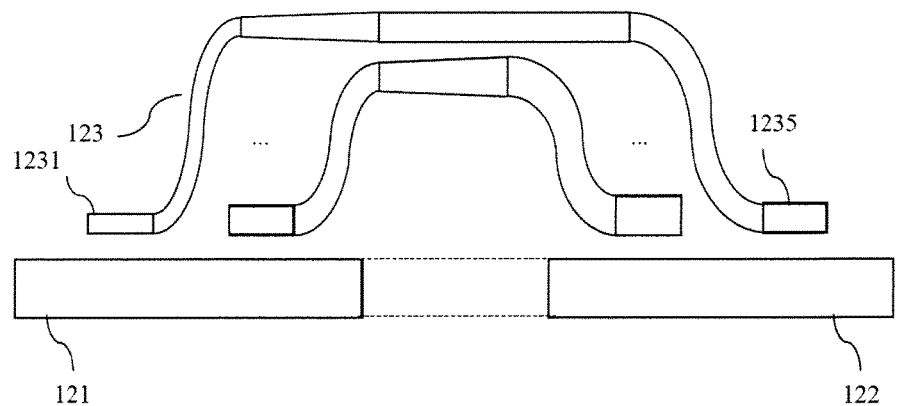
FIG. 3 is a schematic structural diagram of a mode converter according to an embodiment of the present invention.

Referring to FIG. 3, an embodiment of a mode converter in this embodiment of the present invention includes:

an input multimode waveguide 121, an output multimode waveguide 122, and a first conversion waveguide 123.

The input multimode waveguide 121 is configured to receive a first signal, and a mode of the first signal is a first mode.

The first conversion waveguide 123 has an input coupling waveguide 1231 with a first effective refractive index, and has an output coupling waveguide 1235 with a second effective refractive index; and the first effective refractive index is corresponding to an effective refractive index of the first signal that is in the first mode and that is in the input multimode waveguide, and the second effective refractive index is corresponding to an effective refractive index of the first signal that is in a second mode and that is in the output multimode waveguide.

In actual application, the input coupling waveguide 1231 and the output coupling waveguide 1235 each may be a multimode waveguide, or may be a single-mode waveguide, and no specific limitation is imposed herein.

The first conversion waveguide 123 is configured to: perform, by using the input coupling waveguide 1231, evanescent wave coupling on the first signal that is in the first mode and that is transmitted in the input multimode waveguide, and couple the first signal to the second mode of the output multimode waveguide by using the output coupling waveguide 1235, so as to obtain the first signal in the second mode.

The output multimode waveguide 122 is configured to output the first signal in the second mode.

Optionally, widths of the input multimode waveguide and the output multimode waveguide may be the same, or may be different. This is specifically determined according to an actual signal mode and the effective refractive index, and no limitation is imposed herein.

Specifically, referring to FIG. 6 to FIG. 11, the first conversion waveguide in this embodiment of the present invention may further include an input bend waveguide 1232, a connection waveguide 1233, and an output bend waveguide 1234. Waveguide widths of input coupling waveguides 1231 are different from each other, and waveguide widths of output coupling waveguides 1235 are different from each other.

The input coupling waveguide 1231 is configured to perform the evanescent wave coupling with the first signal transmitted in the input multimode waveguide, so that the first signal that is in the first mode and that is in the input multimode waveguide is coupled to a third mode of the input coupling waveguide.

A width of the input coupling waveguide meets the following condition: the first mode of the input multimode waveguide and the third mode of the input coupling waveguide meet a phase matching condition; and a length of the input coupling waveguide meets the following condition: the first signal in the first mode is coupled to the third mode of the input coupling waveguide.

The output coupling waveguide 1235 is configured to perform the evanescent wave coupling with the output multimode waveguide, so that the first signal that is in the third mode and that is output by the output coupling waveguide is coupled to the second mode of the output multimode waveguide.

A width of the output coupling waveguide meets the following condition: the third mode of the output multimode waveguide and the second mode of the output coupling waveguide meet the phase matching condition; and a length of the output coupling waveguide meets the following condition: the first signal that is in the third mode and that is output by the output coupling waveguide is coupled to the second mode of the output multimode waveguide.

The input bend waveguide 1232 is configured to prevent the connection waveguide from approaching the input multimode waveguide.

The output bend waveguide 1234 is configured to prevent the connection waveguide from approaching the output multimode waveguide.

The connection waveguide 1233 is configured to connect the input bend waveguide and the output bend waveguide.

In actual application, the effective refractive index in this embodiment of the present invention is an important and a common parameter in an optical waveguide, and is related to a dimension of a waveguide and a refractive index of a material of the waveguide. Once the dimension and the material that are of the waveguide are determined, the effective refractive index of the waveguide is also determined. Effective refractive indexes that are in different modes and that are transmitted in the waveguide are different from each other, as shown in the following Table 1.

TABLE 1

| Waveguide widths are equal to 2 μm | | | |
|---|---|---|---|
| TE 0 | 2.828 | TM 0 | 2.04 |
| TE 1 | 2.749 | TM 1 | 1.948 |
| TE 2 | 2.613 | TM 2 | 1.793 |
| TE 3 | 2.412 | TM 3 | 1.578 |
| TE 4 | 2.131 | | |
| TE 5 | 1.758 | | |

Figure 4:
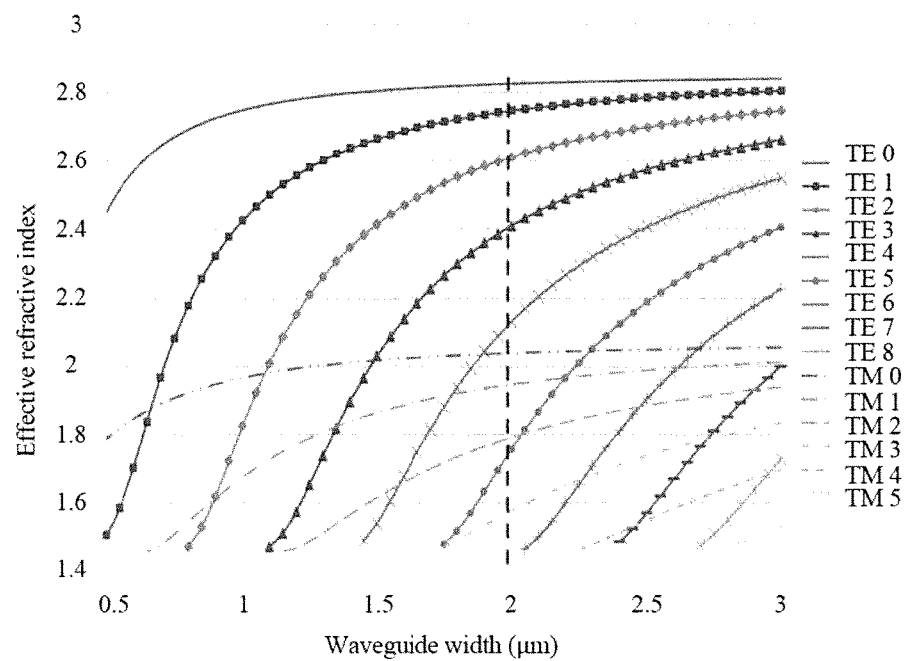
FIG. 4 is a schematic diagram of a relationship between an effective refractive index and a waveguide width according to an embodiment of the present invention.

In Table 1, TE x and TM x represent different modes. When the waveguide widths are 2 μm, the effective refractive index in each mode is shown in Table 1. Further, referring to FIG. 4, FIG. 4 shows a relationship between the effective refractive index and the waveguide width. Curves in FIG. 4 represent different modes. A straight dashed line with a horizontal coordinate value of 2 indicates the effective refractive index in each mode when the waveguide widths are 2 In actual application, when spacing between two transmission waveguides is less than a specific value, and effective refractive indexes of the two transmission waveguides are close (that is, a difference between the two effective refractive indexes is less than a specified range), the phase matching condition is met, and a signal transmitted in either of the transmission waveguides is coupled to the other transmission waveguide.

The following gives a group of specific parameters: a waveguide width of the input multimode waveguide is 1.7 a waveguide width of the output multimode waveguide is 1.7 a waveguide width of the input coupling waveguide is 0.4 a waveguide width of the output multimode waveguide is 0.55 μm, and all waveguide heights are 0.22 μm. This group of the parameters may be used to convert the TE 3 mode of a multimode waveguide to the TE 2 mode (for the specific parameters, refer to Table 2).

In this embodiment of the present invention, when the first signal in the first mode is transmitted to the input multimode waveguide 121, because the input multimode waveguide 121 and the input coupling waveguide 1231 in the first conversion waveguide 123 meet the phase matching condition, the first signal is coupled to the first conversion waveguide 123 for transmission. In this case, the mode of the first signal is converted from the original first mode to the third mode corresponding to the first conversion waveguide 123. When the first signal in the third mode is transmitted to the output coupling waveguide 1235 in the first conversion waveguide 123, because the output multimode waveguide 123 and the output coupling waveguide 1235 in the first conversion waveguide 123 meet the phase matching condition, the first signal is coupled to the output multimode waveguide 122 for transmission. In this case, the mode of the first signal is converted, according to the second effective refractive index corresponding to the output coupling waveguide 1235 in the first conversion waveguide 123, from the third mode to the second mode corresponding to the output multimode waveguide 122. Now the first signal is converted from the first mode to the second mode.

Further, in actual application, if the input multimode waveguide receives a second signal in a fourth mode, a conversion waveguide in this embodiment of the present invention further includes a second conversion waveguide.

The second conversion waveguide has an input coupling waveguide with a third effective refractive index, and has an output coupling waveguide with a fourth effective refractive index; and the third effective refractive index is corresponding to an effective refractive index of the second signal that is in the fourth mode and that is in the input multimode waveguide, and the fourth effective refractive index is corresponding to an effective refractive index of the second signal that is in a fifth mode and that is in the output multimode waveguide.

The second conversion waveguide is configured to: perform the evanescent wave coupling on the second signal transmitted in the input multimode waveguide, and couple the second signal to the fifth mode of the output multimode waveguide by using the output coupling waveguide, so as to obtain the second signal in the fifth mode.

It may be understood that, in actual application, the mode converter may include multiple conversion waveguides. One conversion waveguide performs a mode conversion on signals in one mode, and no specific limitation is imposed herein.

Optionally, the input multimode waveguide is further configured to receive a third signal in a sixth mode.

The input multimode waveguide is connected to the output multimode waveguide, and the third signal in the sixth mode is transmitted from the input multimode waveguide to the output multimode waveguide, and then is output by the output multimode waveguide.

In actual application, the mode converter in this embodiment of the present invention may further transmit a signal that does not require the mode conversion (for example, the third signal in the sixth mode). When the third signal is transmitted to the input multimode waveguide, because no conversion waveguide in the mode converter can be used to couple with the third signal in the sixth mode, the third signal is directly transmitted from the input multimode waveguide to the output multimode waveguide, and then is output by the output multimode waveguide without a process of the mode conversion.

In this embodiment of the present invention, "the first effective refractive index" and "the second effective refractive index" represent only two different effective refractive indexes, and do not specifically refer to any effective refractive index in actual application; "the first signal" and "the second signal" represent two different signals, and do not specifically refer to any signal in actual application; and "the first mode" and "the second mode" represent two different signal modes, and do not specifically refer to any signal mode in actual application; likewise, in this embodiment of the present invention, any concept of "$N^{th}$" is only for ease of description, and does not specifically refer to any specific concept in actual application.

The following describes a work process of each module in the foregoing mode converter.

A multimode transmission waveguide transmits multiple signals to the input multimode waveguide 121. In this case, the signals are corresponding to different modes.

As shown in FIG. 3, because the first effective refractive index is corresponding to the first mode of the input multimode waveguide, when the first signal is transmitted to a close end (that is, in the vicinity of the input coupling waveguide 1231) between the input multimode waveguide 121 and the conversion waveguide 123, the input coupling waveguide 1231 performs the evanescent wave coupling with the first signal that is in the first mode and that is transmitted in the input multimode waveguide 121 (in this case, the first signal is converted from the first mode to the third mode, and the effective refractive index that is in the third mode and that is of the input coupling waveguide 1231 is the first effective refractive index); when the signal is transmitted in the conversion waveguide 123, after the signal enters the output coupling waveguide 1235 by using the connection waveguide in the conversion waveguide 123 (in this case, the first signal is still in the third mode, but the effective refractive index that is in the third mode and that is of the output coupling waveguide 1235 is the second effective refractive index), because the waveguide width of the output coupling waveguide 1235 is different from the waveguide width of the input coupling waveguide 1231, when the first signal is transmitted to a close end (that is, in the vicinity of the output coupling waveguide 1235) between the output multimode waveguide 122 and the conversion waveguide 123, the first signal is coupled to the second mode (which is converted from the third mode to the second mode) in which the effective refractive index of the output multimode waveguide 122 is the second effective refractive index, so as to implement the mode conversion of the first signal.

According to this embodiment of the present invention, the mode converter includes the input multimode waveguide, the output multimode waveguide, and the first conversion waveguide. The first conversion waveguide performs, by using an input coupling waveguide, evanescent wave coupling on a first signal that is in a first mode and that is transmitted in the input multimode waveguide, and couples the first signal to the second mode of the output multimode waveguide by using an output coupling waveguide. A mode conversion of a signal is completed by using only one conversion device, thereby reducing an insertion loss in a signal conversion process.

Referring to FIG. 6 to FIG. 11, an embodiment of a mode converter in this embodiment of the present invention includes:

an input multimode waveguide 121, an output multimode waveguide 122, and a first conversion waveguide 123. Specifically, an input coupling waveguide 1231 couples a signal in the input multimode waveguide 121 to the first conversion waveguide 123; when a first signal is transmitted to a close end (that is, in the vicinity of an output coupling waveguide 1235) between the output multimode waveguide 122 and the first conversion waveguide 123, the first signal is coupled to a second mode in which an effective refractive index of the output multimode waveguide 122 is a second effective refractive index.

Figure 6:
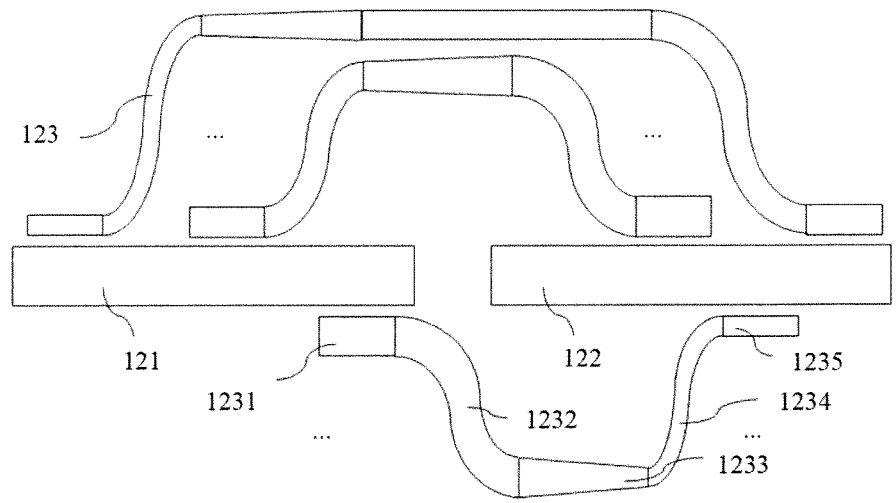
FIG. 6 is another schematic structural diagram of a mode converter according to an embodiment of the present invention.
Figure 7:
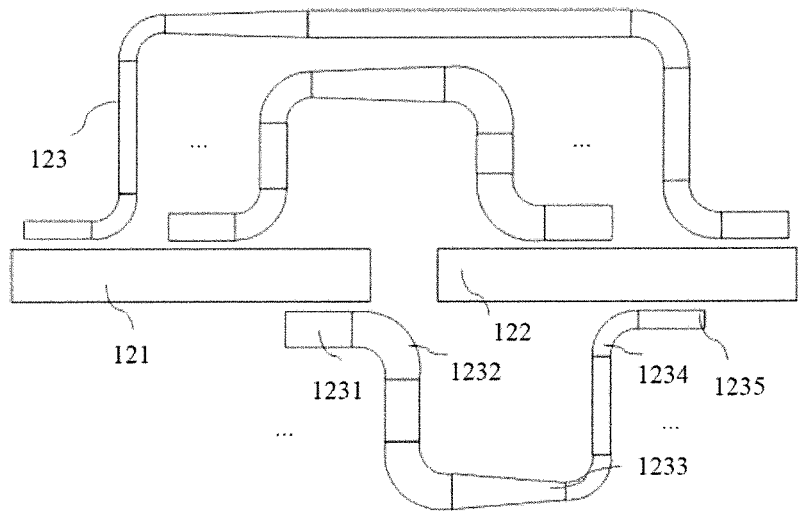
FIG. 7 is another schematic structural diagram of a mode converter according to an embodiment of the present invention.
Figure 8:
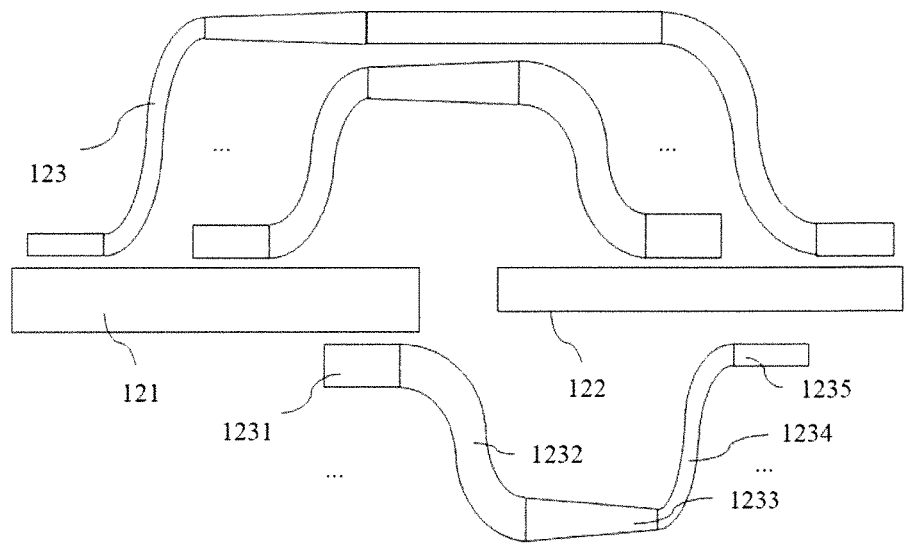
FIG. 8 is another schematic structural diagram of a mode converter according to an embodiment of the present invention.
Figure 9:
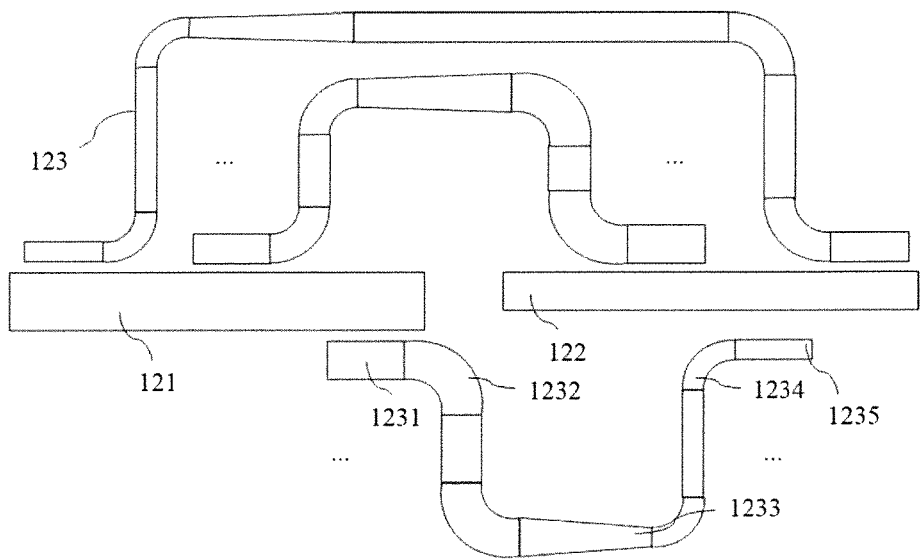
FIG. 9 is another schematic structural diagram of a mode converter according to an embodiment of the present invention.

For example, in actual application, widths of the input multimode waveguide 121 and the output multimode waveguide 122 may be the same, as shown in FIG. 6 and FIG. 7; optionally, widths of the input multimode waveguide 121 and the output multimode waveguide 122 may be different, as shown in FIG. 8 and FIG. 9, so as to implement a mode conversion between multimode waveguides that have different widths.

Specifically, the conversion waveguide 123 includes the input coupling waveguide 1231, an input bend waveguide 1232, a connection waveguide 1233, an output bend waveguide 1234, and the output coupling waveguide 1235. Waveguide widths of input coupling waveguides 1231 are different from each other, and waveguide widths of output coupling waveguides 1235 are different from each other.

In actual application, when effective refractive indexes that are in two modes and that are of two adjacent waveguides are close (that is, a difference between the two effective refractive indexes is within a specific range), the corresponding two modes meet a phase matching condition. An energy coupling and the mode conversion may be performed between modes that meet the phase matching condition. One mode of one waveguide may be coupled, by selecting appropriate waveguide spacing and an appropriate coupling length, to the other mode corresponding to the other waveguide.

The input bend waveguide 1232 is configured to prevent the connection waveguide 1233 from approaching the input multimode waveguide 121. Specifically, after the input coupling waveguide 1231 completes a signal coupling, to prevent the first signal obtained after the mode conversion from being reversely coupled to the input multimode waveguide 121, the input bend waveguide 1232 needs to be disposed.

The output bend waveguide 1234 is configured to prevent the connection waveguide 1233 from approaching the output multimode waveguide. Specifically, after the output coupling waveguide 1235 couples a signal to the output multimode waveguide 122, to prevent the first signal obtained after the mode conversion from being reversely coupled to the output coupling waveguide 1235, the output bend waveguide 1234 needs to be disposed.

Optionally, the input bend waveguide 1232 or the output bend waveguide 1234 may be an S-shape waveguide, or a combination of a 90-degree circular waveguide and a straight waveguide; and a width of the input bend waveguide is equal to a width of the input coupling waveguide, and a width of the output bend waveguide is equal to a width of the output coupling waveguide.

Specifically, for a scenario in which the output bend waveguide 1234 and the input bend waveguide 1232 may be the S-shape waveguide, refer to FIG. 6 or FIG. 8; for a scenario in which the output bend waveguide 1234 and the input bend waveguide 1232 may be a combination of the 90-degree circular waveguide and the straight waveguide, refer to FIG. 7 or FIG. 9.

The connection waveguide 1233 is configured to connect to the input bend waveguide 1232 and the output bend waveguide 1234. Specifically, the connection waveguide may include a tapered waveguide; widths of head and tail ends of the tapered waveguide are respectively equal to the widths of the input bend waveguide 1232 and the output bend waveguide 1233. Further, in actual application, the connection waveguide may include a straight waveguide, and the straight waveguide is connected to the tapered waveguide, so as to adapt to a position and a length that are of the input bend waveguide 1232 or the output bend waveguide 1233. Specifically, the tapered waveguide may be an adiabatic tapered waveguide; when performing the mode conversion on the signal, the adiabatic tapered waveguide may effectively reduce an extra energy loss.

Figure 10:
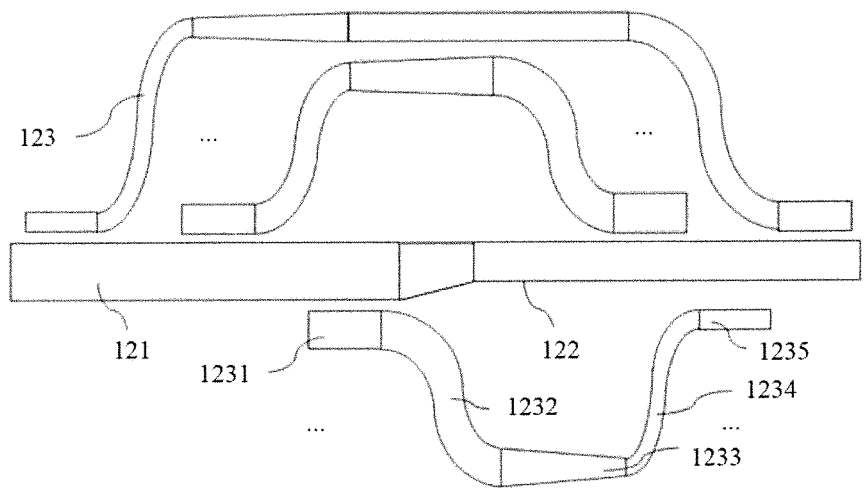
FIG. 10 is another schematic structural diagram of a mode converter according to an embodiment of the present invention.
Figure 11:
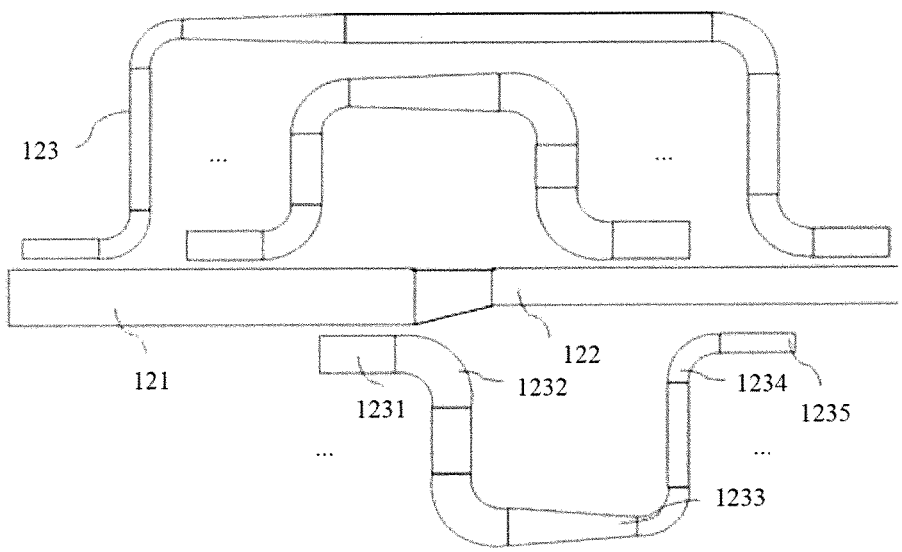
FIG. 11 is another schematic structural diagram of a mode converter according to an embodiment of the present invention.

In actual application, if not all signals received by the input multimode waveguide require a mode conversion, the connection waveguide uses the adiabatic tapered waveguide; when the mode conversion is performed on N signals, those signals that do not require the mode conversion may be directly retained in a multimode transmission waveguide, so as to decrease a quantity of coupling waveguides. As shown in FIG. 10 and FIG. 11, those signals that do not require the mode conversion are directly transmitted from the input multimode waveguide 121 to the output multimode waveguide 122.

According to this embodiment of the present invention, the mode converter has a simple device structure, is compatible with the CMOS process, and can be easily integrated; in addition, the mode converter in this embodiment of the present invention imposes no limitation on a mode quantity and a polarization state that are of a multimode waveguide, and can increase or decrease a quantity of conversion waveguides and some components according to an actual situation, so as to adapt to an actual application scenario; further, the mode converter can be used in a multi-wavelength condition.

In a multimode signal transmission process, because of a large difference between effective refractive indexes that are between different modes and that are of the multimode transmission waveguide, a transmission speed and a loss that are between different modes are different, thereby resulting in a dispersion delay and a power imbalance. In the prior art, there is no solution to this problem in a system on chip.

This embodiment of the present invention further provides a multimode waveguide transmission apparatus, which is configured to resolve problems of the dispersion delay and the power imbalance that are caused by different modes of the signal in the multimode signal transmission process of a system on chip. For details, refer to the following embodiment:

The multimode waveguide transmission apparatus and a corresponding signal transmission method provided in this embodiment of the present invention are mainly an improvement on a multimode waveguide connection part between a mode multiplexer and a mode demultiplexer in FIG. 2.

Figure 5:
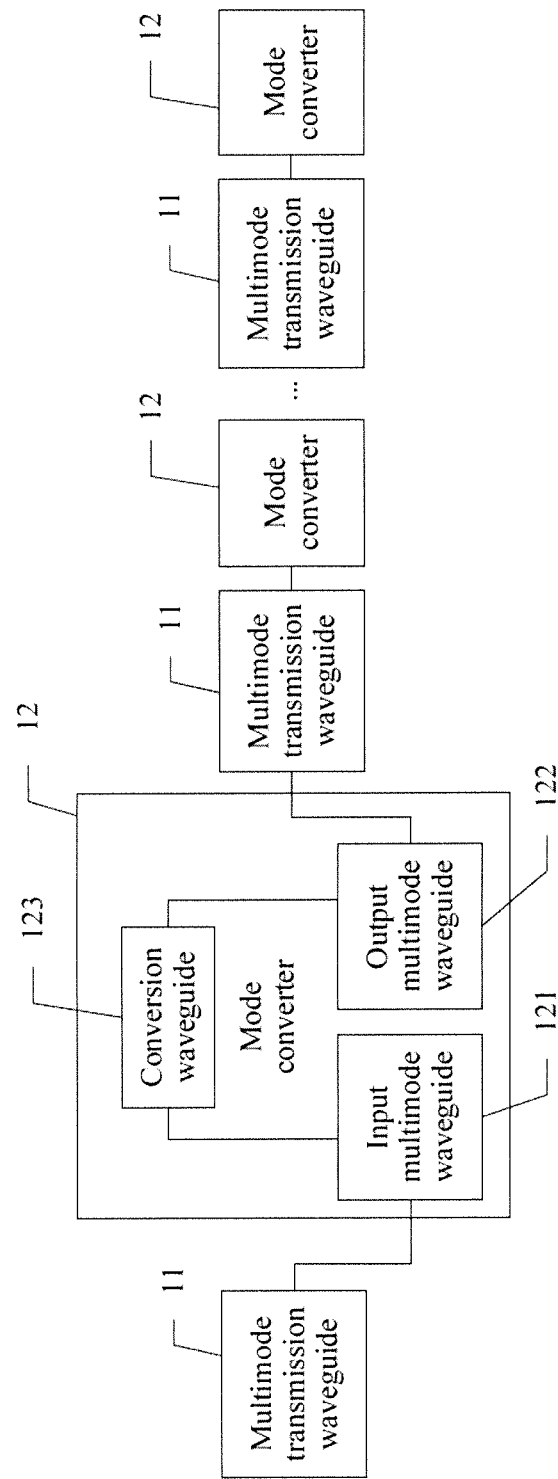
FIG. 5 is a schematic structural diagram of a multimode waveguide transmission apparatus according to an embodiment of the present invention.

Referring to FIG. 5, an embodiment of a multimode waveguide transmission apparatus in this embodiment of the present invention includes:

M or M+1 multimode transmission waveguides 11 and M mode converters 12, where the multimode transmission waveguides 11 are alternately connected to the mode converters 12, M is greater than or equal to a quantity of signals that require a mode conversion, and M is an integer.

In actual application, a connection relationship between a quantity of segments of the multimode transmission waveguides 11 and the mode converters 12 may be as follows: The quantity of the segments of the multimode transmission waveguides 11 and a quantity of the mode converters 12 may be equal, and the first multimode transmission waveguide 11 is disposed before the first mode converter 12, as shown in FIG. 5; optionally, the quantity of the segments of the multimode transmission waveguides 11 and a quantity of the mode converters 12 may be equal, and the first mode converter 12 is disposed before the first multimode transmission waveguide 11; optionally, the quantity of the segments of the multimode transmission waveguides 11 may be one more than a quantity of the mode converters 12, and the first multimode transmission waveguide 11 is disposed before the first mode converter 12.

Specifically, the M or M+1 multimode transmission waveguides 11 may have the same physical structure.

The mode converter 12 is configured to separately perform the mode conversion on a first signal and a second signal that are input, where modes of the first signal and the second signal are respectively a first mode and a second mode before the first mode converter performs the mode conversion, and when the last mode converter completes the conversion, a mode of each signal is the same as a mode before the first mode conversion.

The multimode transmission waveguide 11 is configured to transmit the first signal and the second signal, where in the first mode or the second mode, the first signal and the second signal are transmitted for an equal distance in the multimode transmission waveguide.

According to this embodiment of the present invention, the described "equal transmission distance" is not strictly equal. In actual application, there may be a specific error range, which is specifically subject to an effect of compensating for a dispersion delay and a power imbalance that are between modes of a multimode waveguide.

Figure 12:
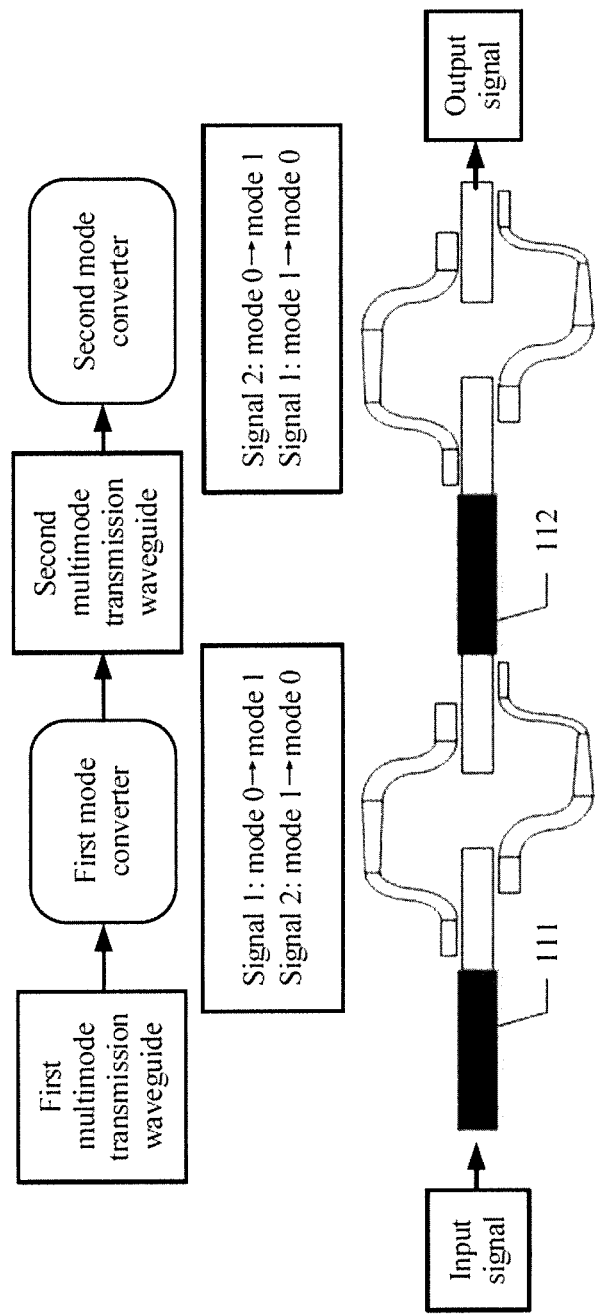
FIG. 12 is another schematic structural diagram of a multimode waveguide transmission apparatus according to an embodiment of the present invention.

For example, as shown in FIG. 12, let a first signal be a signal 1, a second signal be a signal 2, a first mode be a mode 0, a second mode be a mode 1, a first multimode transmission waveguide be a multimode transmission waveguide 111, and a second multimode transmission waveguide be a multimode transmission waveguide 112.

The signal 1 in the mode 0 and the signal 2 in the mode 1 are transmitted in the first multimode transmission waveguide, and the signal 1 and the signal 2 are transmitted from the first multimode transmission waveguide to a first mode converter. In the first mode converter, the signal 1 is converted from the mode 0 to the mode 1, the signal 2 is converted from the mode 1 to the mode 0, and the signal 1 in the mode 1 and the signal 2 in the mode 0 are transmitted to the second multimode transmission waveguide, and then are transmitted to a second mode converter. In the second mode converter, the signal 1 is converted from the mode 1 to the mode 0, the signal 2 is converted from the mode 0 to the mode 1, and then the signal 1 in the mode 0 and the signal 2 in the mode 1 are output.

During the transmission process, in the mode 0, the signal 1 and the signal 2 are transmitted for an equal distance in the multimode transmission waveguide. In the mode 1, the signal 1 and the signal 2 are also transmitted for an equal distance in the multimode transmission waveguide. Specifically, the distance transmitted in the multimode transmission waveguide includes the sum of distances transmitted in the multimode transmission waveguide 111 and the multimode transmission waveguide 112. It may be understood that, regardless of a quantity of segments included in the multimode transmission waveguide, this embodiment of the present invention focuses on the sum of lengths of multiple multimode transmission waveguides.

Optionally, the mode converter is further configured to perform the mode conversion on a third signal that is input, and a mode of the third signal is a third mode before the first mode converter performs the mode conversion.

The multimode transmission waveguide is further configured to transmit the third signal, and in the first mode, the second mode, or the third mode, the first signal, the second signal, and the third signal are transmitted for the equal distance in the multimode transmission waveguide.

Figure 13:
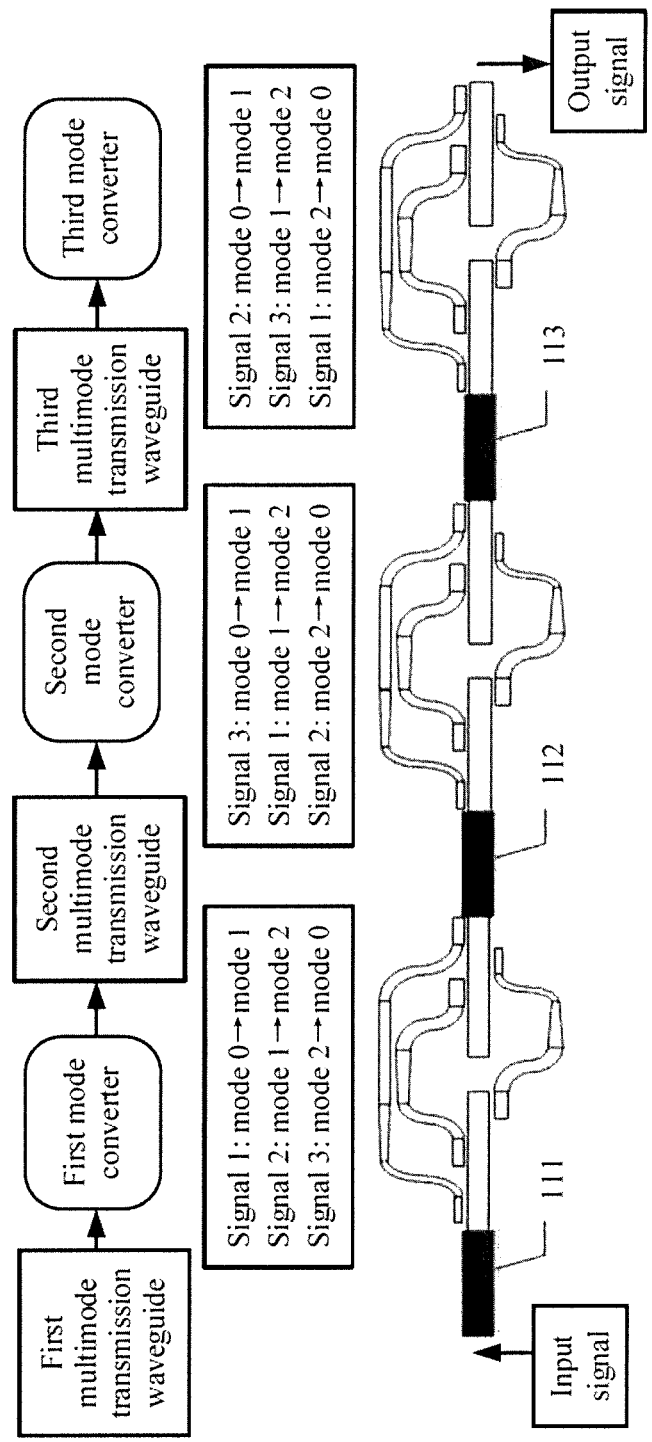
FIG. 13 is another schematic structural diagram of a multimode waveguide transmission apparatus according to an embodiment of the present invention.

For example, as shown in FIG. 13, let a first signal be a signal 1, a second signal be a signal 2, a third signal be a signal 3, a first mode be a mode 0, a second mode be a mode 1, a third mode be a mode 2, a first multimode transmission waveguide be a multimode transmission waveguide 111, a second multimode transmission waveguide be a multimode transmission waveguide 112, and a third multimode transmission waveguide be a multimode transmission waveguide 113.

The signal 1 in the mode 0, the signal 2 in the mode 1, and the signal 3 in the mode 2 are transmitted in the first multimode transmission waveguide, and the signal 1, the signal 2 and the signal 3 are transmitted from the first multimode transmission waveguide to a first mode converter. In the first mode converter, the signal 1 is converted from the mode 0 to the mode 1, the signal 2 is converted from the mode 1 to the mode 2, and the signal 3 is converted from the mode 2 to the mode 0.

The signal 1 in the mode 1, the signal 2 in the mode 2, and the signal 3 in the mode 0 are transmitted to the second multimode transmission waveguide, and then are transmitted to a second mode converter. In the second mode converter, the signal 1 is converted from the mode 1 to the mode 2, the signal 2 is converted from the mode 2 to the mode 0, and the signal 3 is converted from the mode 0 to the mode 1.

The signal 1 in the mode 2, the signal 2 in the mode 0, and the signal 3 in the mode 1 are transmitted to the third multimode transmission waveguide, and then are transmitted to a third mode converter. In the second mode converter, the signal 1 is converted from the mode 2 to the mode 0, the signal 2 is converted from the mode 0 to the mode 1, and the signal 3 is converted from the mode 1 to the mode 2; and then the signal 1 in the mode 0, the signal 2 in the mode 1, and the signal 3 in the mode 2 are output.

During the transmission process, in the mode 0, the signal 1, the signal 2, and the signal 3 are transmitted for an equal distance in the multimode transmission waveguide. In the mode 1, the signal 1, the signal 2, and the signal 3 are transmitted for an equal distance in the multimode transmission waveguide. In the mode 3, the signal 1, the signal 2, and the signal 3 are transmitted for an equal distance in the multimode transmission waveguide. Specifically, the distance transmitted in the multimode transmission waveguide includes the sum of distances transmitted in the multimode transmission waveguide 111, the multimode transmission waveguide 112, and the multimode transmission waveguide 113.

It may be understood that the foregoing example is merely an example. In actual application, a quantity of mode converters may be greater than a quantity of signals that require a mode conversion. That is, if N signals corresponding to N modes need to be transmitted in a multimode waveguide transmission apparatus in this embodiment of the present invention, in a process of performing the mode conversion by multiple mode converters, not only the conversion between the N modes is performed on the N signals, but also the conversion between M (M is an integer greater than N) modes can be completed, provided that the M modes include the N modes, and when the last mode converter completes the conversion, a mode of each signal is the same as a mode before the first mode conversion.

For example, it is assumed that all the N signals that are input require a mode conversion, the N signals are corresponding to N different modes before the first conversion. The following describes a work process of each module in the multimode waveguide transmission apparatus:

After a mode multiplexer outputs N signals in different modes, the N signals in their respective original modes are transmitted from a first multimode transmission waveguide 11 to a first mode converter 12. The mode converter 12 couples signals received by an input multimode waveguide 121 to a conversion waveguide 123, and after a mode conversion of each signal is completed, each signal is output by an output multimode waveguide 122 to a second multimode transmission waveguide 11. In this case, the N signals are transmitted in the second multimode transmission waveguide 11 after the first mode converter 12 completes the mode conversion. By analogy, after being converted to a new mode, a signal is transmitted for a fixed distance in a multimode transmission waveguide 11; when being transmitted to the last multimode transmission waveguide 11, each signal undergoes a transmission state in at least N modes; and after the last multimode transmission waveguide 11 transmits the N signals to the last mode converter 12, the last mode conversion is that a mode X is converted to the original mode of the signal before the first mode conversion, where the mode X may be any one of N modes corresponding to the N signals except the original mode. Now in any one of the N modes, any two of the N signals are transmitted for an equal distance in the multimode transmission waveguide, and the N signals are all output to a mode demultiplexer in their respective original modes.

Specifically, in actual application, at least N mode converters 12 may be implemented based on a same physical structure or different physical structures, provided that an effect produced by a cascade of the at least N mode converters 12 is that "the conversion between different modes is performed on each signal for at least N times, and during the last conversion, the mode of each signal is the same as the mode before the first mode conversion".

Specifically, in actual application, if the quantity of the mode converters 12 is N, the multimode transmission waveguide 11 also has N segments of equal lengths. If the quantity of the mode converters 12 is greater than N, at least one mode is converted twice in the mode conversion performed by the at least N mode converters; although the quantity of the segments of the multimode transmission waveguides 11 is equal to the quantity of the mode converters 12, the lengths of the segments may be different, that is, when a mode is converted twice, the sum of distances of subsequent two corresponding multimode transmission waveguides 11 is equal to a distance of the multimode transmission waveguide 11 when a mode is converted only once.

According to this embodiment of the present invention, if N signals corresponding to N modes need to be transmitted, after each mode conversion, each signal is transmitted for a distance in a multimode transmission waveguide, the conversion between different modes is performed on each signal for at least N times, and in any one of the N modes, any two of the N signals are transmitted for an equal distance in the multimode transmission waveguide, thereby compensating for a dispersion delay and a power imbalance that are between modes of a multimode waveguide in a system on chip.

Referring to FIG. 6 to FIG. 11, an embodiment of a mode converter 12 in this embodiment of the present invention includes:

an input multimode waveguide 121, an output multimode waveguide 122, and a first conversion waveguide 123. Specifically, an input coupling waveguide 1231 couples a signal in the input multimode waveguide 121 to the first conversion waveguide 123; when a first signal is transmitted to a close end (that is, in the vicinity of an output coupling waveguide 1235) between the output multimode waveguide 122 and the first conversion waveguide 123, the first signal is coupled to a second mode in which an effective refractive index of the output multimode waveguide 122 is a second effective refractive index.

The first conversion waveguide has an input coupling waveguide with a first effective refractive index, and has an output coupling waveguide with the second effective refractive index; and the first effective refractive index is corresponding to an effective refractive index of the first signal that is in a first mode and that is in the input multimode waveguide, and the second effective refractive index is corresponding to an effective refractive index of the first signal that is in the second mode and that is in the output multimode waveguide.

The first conversion waveguide is configured to: perform, by using the input coupling waveguide, evanescent wave coupling on the first signal that is in the first mode and that is transmitted in the input multimode waveguide, and couple the first signal to the second mode of the output multimode waveguide by using the output coupling waveguide, so as to obtain the first signal in the second mode.

For example, in actual application, widths of the input multimode waveguide 121 and the output multimode waveguide 122 may be the same, as shown in FIG. 6 and FIG. 7; optionally, widths of the input multimode waveguide 121 and the output multimode waveguide 122 may be different, as shown in FIG. 8 and FIG. 9, so as to implement a mode conversion between multimode waveguides that have different widths.

Specifically, the first conversion waveguide 123 includes the input coupling waveguide 1231, an input bend waveguide 1232, a connection waveguide 1233, an output bend waveguide 1234, and the output coupling waveguide 1235. Waveguide widths of input coupling waveguides 1231 are different from each other, and waveguide widths of output coupling waveguides 1235 are different from each other.

Optionally, the input bend waveguide 1232 or the output bend waveguide 1234 may be an S-shape waveguide, or a combination of a 90-degree circular waveguide and a straight waveguide; and a width of the input bend waveguide is equal to a width of the input coupling waveguide, and a width of the output bend waveguide is equal to a width of the output coupling waveguide.

Specifically, for a scenario in which the output bend waveguide 1234 and the input bend waveguide 1232 may be the S-shape waveguide, refer to FIG. 6 or FIG. 8; for a scenario in which the output bend waveguide 1234 and the input bend waveguide 1232 may be a combination of the 90-degree circular waveguide and the straight waveguide, refer to FIG. 7 or FIG. 9.

The connection waveguide 1233 is configured to connect to the input bend waveguide 1232 and the output bend waveguide 1234. Specifically, the connection waveguide may include a tapered waveguide; widths of head and tail ends of the tapered waveguide are respectively equal to the widths of the input bend waveguide 1232 and the output bend waveguide 1233. Further, in actual application, the connection waveguide may include a straight waveguide, and the straight waveguide is connected to the tapered waveguide, so as to adapt to a position and a length that are of the input bend waveguide 1232 or the output bend waveguide 1233. Specifically, the tapered waveguide may be an adiabatic tapered waveguide; when performing the mode conversion on the signal, the adiabatic tapered waveguide may effectively reduce an extra energy loss.

Optionally, in actual application, it is assumed that N is a quantity of signals that require a mode conversion. If the quantity of the signals received by the input multimode waveguide is greater than N (that is, not all signals require a mode conversion), any conversion waveguide in the mode converter in a multimode waveguide transmission apparatus can couple the signals that do not require the mode conversion. As shown in FIG. 10 and FIG. 11, those signals that do not require the mode conversion are directly transmitted from the input multimode waveguide 121 to the output multimode waveguide 122.

Figure 14:
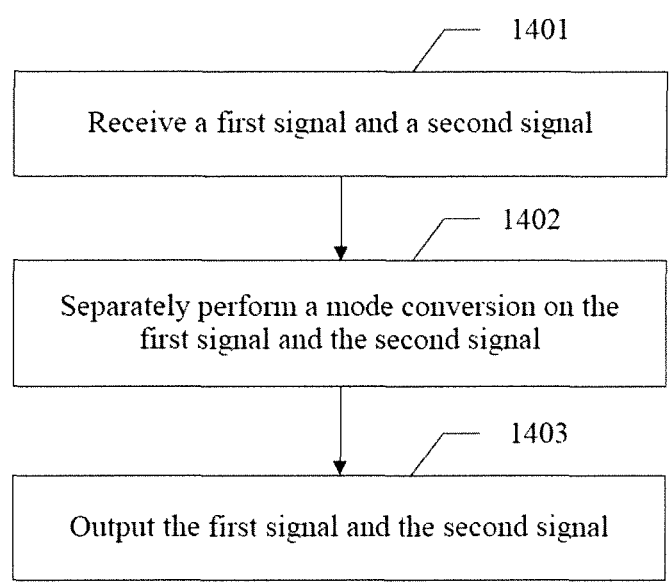
FIG. 14 is a schematic flowchart of a signal processing method according to an embodiment of the present invention.

The following describes a signal transmission method performed by the multimode waveguide transmission apparatus. Referring to FIG. 14, an embodiment of the signal transmission method in this embodiment of the present invention includes:

1401. Receive a first signal and a second signal.

The multimode waveguide transmission apparatus receives the first signal and the second signal, where modes of the first signal and the second signal are respectively a first mode and a second mode before the first mode converter performs a mode conversion.

According to this embodiment of the present invention, it may be understood that only two signals are used as an example for description. In actual application, the multimode waveguide transmission apparatus may be configured to handle problems of chromatic aberration and power imbalance transmission that are of at least two signals.

1402. Separately perform a mode conversion on the first signal and the second signal.

The multimode waveguide transmission apparatus separately performs the mode conversion on the first signal and the second signal, and transmits, by using a multimode transmission waveguide, the first signal and the second signal that are obtained after the mode conversion, so that in the first mode or the second mode, the first signal and the second signal are transmitted for an equal distance in the multimode transmission waveguide.

1403. Output the first signal and the second signal.

The multimode waveguide transmission apparatus outputs the first signal and the second signal, where modes of the first signal and the second signal that are output are the same as their respective modes before the first mode conversion.

Figure 1:
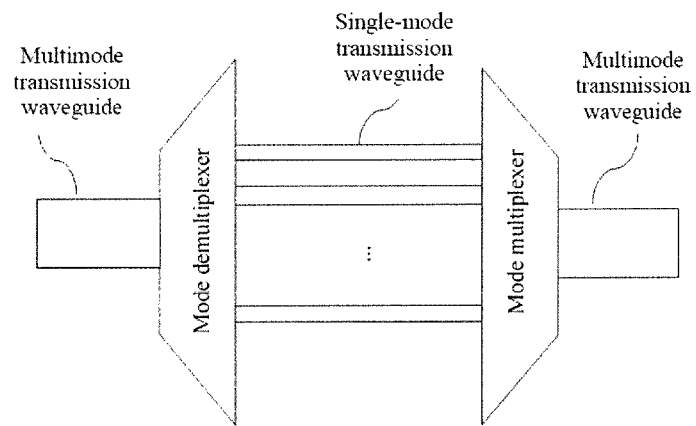
FIG. 1 is a schematic structural diagram of a mode converter in the prior art.

The mode converter in this embodiment of the present invention is a device that has a function of performing the mode conversion on the signal, which may be specifically a mode converter described in the embodiment of the present invention shown in FIG. 3, or may be a mode converter shown in FIG. 1.

According to this embodiment of the present invention, if two signals corresponding to two modes are transmitted, after each mode conversion, each signal is transmitted for a distance in a multimode transmission waveguide; the conversion between the two modes is performed on each signal for at least twice; and in either of the two modes, the two signals are transmitted for an equal distance in the multimode transmission waveguide, thereby compensating for a dispersion delay and a power imbalance that are between modes of a multimode waveguide in a system on chip.

For example, in actual application, if N signals corresponding to N modes need to be transmitted, a mode converter in a multimode waveguide transmission apparatus separately couples the N signals received by an input multimode waveguide to different conversion waveguides, and after a mode conversion of the N signals is completed, the N signals are output by an output multimode waveguide in the multimode waveguide transmission apparatus to a second multimode transmission waveguide. In this case, the N signals are transmitted in the second multimode transmission waveguide after a first mode converter completes the mode conversion. By analogy, after being converted to a new mode, a signal is transmitted for a fixed distance in a multimode transmission waveguide; when being transmitted to the last multimode transmission waveguide, each signal undergoes a transmission state in the at least N modes; and after the last multimode transmission waveguide transmits the N signals to the last mode converter, the last mode conversion is that a mode X is converted to an original mode of the signal before the first mode conversion, where the mode X may be any one of the N modes corresponding to the N signals except the original mode. Now in any one of the N modes, any two of the N signals are transmitted for an equal distance in the multimode transmission waveguide, and the N signals are all output in their respective original modes.

For example, the mode conversion of each signal may follow the following control logic:

If a current mode of a signal is i, and i+n is less than or equal to N−1, the current mode of the signal is converted to i+n during the mode conversion, where i=0, 1, 2, ..., and N−1; or if a current mode of a signal is i, and i+n is greater than N−1, the current mode of the signal is converted to i+n−N, where n is a positive integer and is relatively prime to N.

Optionally, a specific conversion of each signal to a specific mode in the mode conversion may be randomly determined, or may be determined according to a preset mode conversion order (that is, various modes are numbered and sorted, and then are converted according to a fixed order), and no specific limitation is imposed herein.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A mode converter, comprising:
a straight input multimode waveguide, a straight output multimode waveguide, and a first conversion waveguide, wherein:
the straight input multimode waveguide is configured to receive a first signal, and a mode of the first signal is a first mode;
the first conversion waveguide has a straight input coupling waveguide with a first effective refractive index, and has a straight output coupling waveguide with a second effective refractive index; and the first effective refractive index is corresponding to an effective refractive index of the first signal that is in the first mode and that is in the straight input multimode waveguide, and the second effective refractive index is corresponding to an effective refractive index of the first signal that is in a second mode and that is in the straight output multimode waveguide;
the first conversion waveguide is configured to: perform, by using the straight input coupling waveguide, evanescent wave coupling on the first signal that is in the first mode and that is transmitted in the straight input multimode waveguide, and couple the first signal to the second mode of the straight output multimode waveguide by using the straight output coupling waveguide, so as to obtain the first signal in the second mode; and
the straight output multimode waveguide is configured to output the first signal in the second mode.

2. The mode converter according to claim 1, wherein the first conversion waveguide further comprises an input bend waveguide, a connection waveguide, and an output bend waveguide;
the straight input coupling waveguide is configured to perform the evanescent wave coupling with the first signal transmitted in the straight input multimode waveguide, so that the first signal that is in the first mode and that is in the straight input multimode waveguide is coupled to a third mode of the straight input coupling waveguide;
the straight output coupling waveguide is configured to perform the evanescent wave coupling with the straight output multimode waveguide, so that the first signal that is in the third mode and that is output by the straight output coupling waveguide is coupled to the second mode of the straight output multimode waveguide;
the input bend waveguide is configured to prevent the connection waveguide from approaching the straight input multimode waveguide;
the output bend waveguide is configured to prevent the connection waveguide from approaching the straight output multimode waveguide; and
the connection waveguide is configured to separately connect the input bend waveguide and the output bend waveguide.

3. The mode converter according to claim 2, wherein the connection waveguide comprises a tapered waveguide; and widths of head and tail ends of the tapered waveguide are respectively equal to widths of the input bend waveguide and the output bend waveguide.

4. The mode converter according to claim 2, wherein:
a width of the straight input coupling waveguide meets the following condition: the first mode of the straight input multimode waveguide and the third mode of the straight input coupling waveguide meet a phase matching condition;
a length of the straight input coupling waveguide meets the following condition: the first signal in the first mode is coupled to the third mode of the straight input coupling waveguide;
a width of the straight output coupling waveguide meets the following condition: the third mode of the straight output multimode waveguide and the second mode of the straight output coupling waveguide meet the phase matching condition; and
a length of the straight output coupling waveguide meets the following condition: the first signal that is in the third mode and that is output by the straight output coupling waveguide is coupled to the second mode of the straight output multimode waveguide.

5. The mode converter according to claim 2, wherein:
the input bend waveguide comprises an S-shape waveguide, or a combination of a 90-degree circular waveguide and a straight waveguide; and the width of the input bend waveguide is equal to the width of the straight input coupling waveguide; and
the output bend waveguide comprises the S-shape waveguide, or a combination of the 90-degree circular waveguide and the straight waveguide; and the width of the output bend waveguide is equal to the width of the straight output coupling waveguide.

6. The mode converter according to claim 1, wherein:
widths of the straight input multimode waveguide and the straight output multimode waveguide are the same; or
widths of the straight input multimode waveguide and the straight output multimode waveguide are different.

7. The mode converter according to claim 1, wherein:
the straight input multimode waveguide is further configured to receive a second signal, and a mode of the second signal is a fourth mode; and
the mode converter further comprises a second conversion waveguide;
the second conversion waveguide has a straight input coupling waveguide with a third effective refractive index, and has a straight output coupling waveguide with a fourth effective refractive index; and the third effective refractive index is corresponding to an effective refractive index of the second signal that is in the fourth mode and that is in the straight input multimode waveguide, and the fourth effective refractive index is corresponding to an effective refractive index of the second signal that is in a fifth mode and that is in the straight output multimode waveguide;

the second conversion waveguide is configured to: perform the evanescent wave coupling on the second signal transmitted in the straight input multimode waveguide, and couple the second signal to the fifth mode of the straight output multimode waveguide by using the straight output coupling waveguide, so as to obtain the second signal in the fifth mode; and the straight output multimode waveguide is further configured to output the second signal in the fifth mode.

8. The mode converter according to claim 7, wherein:
the straight input multimode waveguide is further configured to receive a third signal in a sixth mode; and
the straight input multimode waveguide is connected to the straight output multimode waveguide, and the third signal in the sixth mode is transmitted from the straight input multimode waveguide to the straight output multimode waveguide, and then is output by the straight output multimode waveguide.

9. A multimode waveguide transmission apparatus, comprising:
M or M+1 multimode transmission waveguides and M mode converters, wherein the multimode transmission waveguides are alternately connected to the M mode converters, M is greater than or equal to a quantity of signals that require a mode conversion, and M is an integer;

each of the M mode converters is configured to separately perform the mode conversion on a first signal and a second signal that are input, wherein modes of the first signal and the second signal are respectively a first mode and a second mode before a first mode converter performs the mode conversion, and when a last mode converter completes the conversion, a mode of each signal is the same as a mode before the first mode conversion; and the multimode transmission waveguide is configured to transmit the first signal and the second signal, wherein in the first mode or the second mode, the first signal and the second signal are transmitted for an equal distance in the multimode transmission waveguide.

10. The multimode waveguide transmission apparatus according to claim 9, wherein:
each of the M mode converters is further configured to perform the mode conversion on a third signal that is input, and a mode of the third signal is a third mode before the first mode converter performs the mode conversion; and the multimode transmission waveguide is further configured to transmit the third signal, and in the first mode, the second mode, or the third mode, the first signal, the second signal, and the third signal are transmitted for the equal distance in the multimode transmission waveguide.

11. The multimode waveguide transmission apparatus according to claim 9, wherein:
each of the M mode converters comprise an input multimode waveguide, an output multimode waveguide, and a conversion waveguide;
the input multimode waveguide is configured to receive the first signal and the second signal;

the conversion waveguide is configured to perform the mode conversion on the first signal and the second signal that are transmitted in the input multimode waveguide; and the output multimode waveguide is configured to output the first signal and the second signal that are obtained after the mode conversion.

12. The multimode waveguide transmission apparatus according to claim 11, wherein the conversion waveguide comprises a first conversion waveguide;
the first conversion waveguide has an input coupling waveguide with a first effective refractive index, and has an output coupling waveguide with a second effective refractive index; and the first effective refractive index is corresponding to an effective refractive index of the first signal that is in the first mode and that is in the input multimode waveguide, and the second effective refractive index is corresponding to an effective refractive index of the first signal that is in the second mode and that is in the output multimode waveguide; and the first conversion waveguide is configured to: perform, by using the input coupling waveguide, evanescent wave coupling on the first signal that is in the first mode and that is transmitted in the input multimode waveguide, and couple the first signal to the second mode of the output multimode waveguide by using the output coupling waveguide, so as to obtain the first signal in the second mode.

13. The multimode waveguide transmission apparatus according to claim 12, wherein the first conversion waveguide further comprises an input bend waveguide, a connection waveguide, and an output bend waveguide;
the input coupling waveguide is configured to perform the evanescent wave coupling with the first signal transmitted in the input multimode waveguide, so that the first signal that is in the first mode and that is in the input multimode waveguide is coupled to a fourth mode of the input coupling waveguide;

the output coupling waveguide is configured to perform the evanescent wave coupling with the output multimode waveguide, so that the first signal that is in the fourth mode and that is output by the output coupling waveguide is coupled to the second mode of the output multimode waveguide;

the input bend waveguide is configured to prevent the connection waveguide from approaching the input multimode waveguide;

the output bend waveguide is configured to prevent the connection waveguide from approaching the output multimode waveguide; and the connection waveguide is configured to separately connect the input bend waveguide and the output bend waveguide.

14. The multimode waveguide transmission apparatus according to claim 13, wherein the connection waveguide comprises a tapered waveguide; and widths of head and tail ends of the tapered waveguide are respectively equal to widths of the input bend waveguide and the output bend waveguide.

15. The multimode waveguide transmission apparatus according to claim 12, wherein:
a width of the input coupling waveguide meets the following condition: the first mode of the input multimode waveguide and a fourth mode of the input coupling waveguide meet a phase matching condition;

a length of the input coupling waveguide meets the following condition: the first signal in the first mode is coupled to the fourth mode of the input coupling waveguide;

a width of the output coupling waveguide meets the following condition: the fourth mode of the output multimode waveguide and the second mode of the output coupling waveguide meet the phase matching condition; and a length of the output coupling waveguide meets the following condition: the first signal that is in the fourth mode and that is output by the output coupling waveguide is coupled to the second mode of the output multimode waveguide.

16. The multimode waveguide transmission apparatus according to claim 13, wherein:

the input bend waveguide comprises an S-shape waveguide, or a combination of a 90-degree circular waveguide and a straight waveguide; and a width of the input bend waveguide is equal to a width of the input coupling waveguide; and the output bend waveguide comprises the S-shape waveguide, or a combination of the 90-degree circular waveguide and the straight waveguide; and the width of the output bend waveguide is equal to the width of the output coupling waveguide.

17. The multimode waveguide transmission apparatus according to claim 11, wherein:

widths of the input multimode waveguide and the output multimode waveguide are the same; or widths of the input multimode waveguide and the output multimode waveguide are different.

18. A signal transmission method, comprising:

receiving a first signal and a second signal, wherein modes of the first signal and the second signal are respectively a first mode and a second mode before a first mode converter performs a first mode conversion;

separately performing the first mode conversion on the first signal and the second signal, and transmitting, by using a multimode transmission waveguide, the first signal and the second signal that are obtained after the mode conversion, so that in the first mode or the second mode, the first signal and the second signal are transmitted for an equal distance in the multimode transmission waveguide;

separately performing a second mode conversion on the first signal and the second signal; and outputting the first signal and the second signal, wherein modes of the first signal and the second signal that are output are the same as their respective modes before the first mode conversion.

19. The method according to claim 18, the method further comprises:

performing the mode conversion on a third signal that is input, and a mode of the third signal is a third mode before the first mode converter performs the mode conversion; and transmitting the third signal, and in the first mode, the second mode, or the third mode, the first signal, the second signal, and the third signal are transmitted for the equal distance in the multimode transmission waveguide.

* * * * *